United States Patent [19]

Moritan et al.

[11] Patent Number: 5,623,382
[45] Date of Patent: Apr. 22, 1997

[54] DISK DRIVING APPARATUS

[75] Inventors: Norishige Moritan, Tottori-ken; Minoru Kuroda, Sakaiminato; Hideshi Fukutani, Yonago, all of Japan

[73] Assignee: Matsushita Electrical Industrial Co., Ltd., Osaka, Japan

[21] Appl. No.: 445,558

[22] Filed: May 23, 1995

Related U.S. Application Data

[63] Continuation of Ser. No. 92,795, Jul. 19, 1993, abandoned.

[30] Foreign Application Priority Data

Jan. 29, 1993 [JP] Japan .................................. 5-014039

[51] Int. Cl.⁶ .............................. G11B 17/02; H02K 5/24; H02K 7/08
[52] U.S. Cl. ....................... 360/99.08; 310/51; 310/67 R; 310/90.5
[58] Field of Search ............................. 360/99.08, 98.07, 360/99.04; 310/90, 90.5, 51, 42, 67 R; 384/100, 113, 107

[56] References Cited

U.S. PATENT DOCUMENTS

| | | | |
|---|---|---|---|
| 3,726,575 | 4/1973 | Moorman | 310/90 X |
| 4,011,475 | 3/1977 | Schmider | 310/68 R |
| 4,332,428 | 6/1982 | Maruyama | 310/90.5 |
| 4,755,709 | 7/1988 | De Jager | 310/90.5 |
| 4,760,298 | 7/1988 | Kitahara | 310/67 R |
| 4,968,910 | 11/1990 | Meier et al. | 310/90 X |
| 5,059,844 | 10/1991 | Anstine | 310/90 |
| 5,223,758 | 6/1993 | Kataoka et al. | 310/90 |

FOREIGN PATENT DOCUMENTS

| | | | |
|---|---|---|---|
| 57-18812 | 1/1982 | Japan | 384/107 |
| 60-241518 | 11/1985 | Japan | 310/90.5 |

Primary Examiner—Robert S. Tupper
Assistant Examiner—William J. Klimowicz
Attorney, Agent, or Firm—Watson Cole Stevens Davis, P.L.L.C.

[57] ABSTRACT

A disk driving apparatus solves such problems that the position of a rotor is unstable and likely to float, and the rotor is displaced when an excessive acceleration is applied thereto, so that a hydrodynamic bearing mechanism can be used. This apparatus uses a single surface opposing type mechanism in a thrust bearing of a motor. It has a device using a magnetic attraction force to stabilize the position of the rotor and various devices for limiting the amount of movement of the rotor, in which devices members which physically contact the rotor and lock in are provided. As a result, a thrust bearing mechanism can be formed by use of a single surface opposing type thrust bearing which is simple in construction. Advantages such as low height, simplicity in construction, low price, or low consumption of power can be obtained. In particular, the feature of low height is extremely advantageous when a hydrodynamic bearing is used in a thin type apparatus.

28 Claims, 13 Drawing Sheets

DISK DRIVING APPARATUS

This application is a continuation of application Ser. No. 08/092,795, filed Jul. 19, 1993 (abandoned).

BACKGROUND OF THE INVENTION

1. Field of the Invention

The present invention relates to a disk driving apparatus used mainly in the information processing field and, more particularly, to a rotor support construction for a rotor which is used in a spindle motor of the disk driving apparatus.

2. Description of the Prior Art

In recent years, a disk driving apparatus (hereinafter referred to as an apparatus) has become small in size and high in density. A typical example of a product in the field involved with the present invention is shown in FIGS. 14A and 14B. This product is a 2.5" magnetic disk driving apparatus which U.S.'s PrairieTek Co., Ltd. developed first in the world. FIGS. 14A and 14B are cited from a catalogue of the disk driving apparatus. There is a great demand for this type of apparatus, in which emphasis is placed on portability, small size, resistance to impact, low noise, and low power consumption. Naturally, there are the same demands on the spindle motor (hereinafter referred to as a motor) inside the apparatus, for rotating the disk.

One of the key components by which the above performance is determined is the bearings of the motor. Generally, ball bearings have been used as bearings, including the apparatus shown in FIGS. 14A and 14B. Hydrodynamic bearings have attracted attention as ones capable of fulfilling higher levels of the above-mentioned demands, and are being used.

The hydrodynamic bearing comprises a cylindrical shaft and a hollow cylindrical sleeve metal filled in such a manner as to have a clearance with the shaft. A herringbone groove is provided in either one of them. The hydrodynamic bearing is constructed in such a way that the clearance is filled with a fluid (oil in most cases), and the rotor is supported by pressure produced in the fluid as the rotor rotates. It has excellent features in principle as the bearing of this apparatus. For example, the volume occupied by the mechanism is small, and the noise of the rotation thereof is small because the rotor is supported via a fluid. It has excellent resistance to impact, and shaft deflection is small due to an integration effect because the load is burdened around the entire circumference of the shaft. The features explained here are, however, related to a radial bearing, and it has no thrust load support capability along the thrust. Therefore, a bearing specialized for thrust is provided separately.

In the inside of the disk driving apparatus, a magnetic head precisely follows tracks and records and reproduces signals while the head floats above a disk with a very small clearance rotating at high speeds. Therefore, the disk must not move axially during recording and reproduction. The orientation of the apparatus is not always fixed, and it may change its position when in use. In this case also, the disk must not move axially. The apparatus is frequently moved, in particular, for portable applications. If an excessive impact is applied thereto and the rotor is moved axially beyond a limit, the apparatus may be damaged. Therefore, the amount of movement of the rotor must be limited to prevent such a risk. The apparatus cannot be used unless it is so constructed as to satisfy these demands even if the hydrodynamic bearing is superior.

A two-surface opposing type construction has hitherto been proposed for a thrust bearing having performance suitable for such a case as described above. An example thereof is shown in FIGS. 13A and 13B. The figures are cited from the specification of U.S. Pat. No. 4,332,428. Although a detailed explanation is omitted, a support force along the thrust is generated at two surfaces distinguished from each other, and the directions of the forces are made to oppose to each other along the thrust, so that the position of the rotor is maintained. The periphery of gaps $\delta 1$ and $\delta 2$ in FIG. 13B is the thrust bearing surface.

However, this construction has problems. Since there are two thrust opposing surfaces requiring high accuracy, the apparatus is likely to become complex and therefore costly. In addition, the height of the thrust bearing mechanism increases. An increase in the height of the bearing causes the height which can be allocated for the radial hydrodynamic bearing to decrease, and thus it may be impossible to form the hydrodynamic fluid bearing. Further, loss torque usually becomes larger than that in a single surface opposing type, causing the consumption of electric current of the apparatus to increase. The various demands, described above, cannot always be satisfied except for support performance.

Among the single surface opposing types, in which the support surface is formed of a set of thrust bearings, are the following: one in which the spherical surface and the flat surface contact each other at the rotation center as regards the condition of the support surface; and one in which the flat surfaces rotate while they oppose each other, and a hydrodynamic pressure is generated by a means such as a spiral groove provided in one of them in order to support the rotor. However, since the single surface opposing type has a capability to support loads only in one direction, it has the following two problems: (1) the position of the rotor is not stable and likely to float; and (2) the rotor is displaced when an excessive acceleration is applied thereto.

SUMMARY OF THE INVENTION

It is an object of the present invention to provide a disk driving apparatus including means capable of solving the above-mentioned problems while maintaining features such as simplicity in construction, low price, small size, thinness, low consumption of electric power, low noise or the like, making it possible to use a hydrodynamic bearing mechanism in an apparatus.

In the present invention, a single surface opposing type mechanism is used in the thrust bearing of the motor of the apparatus, and a means using a magnetic attraction force is provided for rotor position stabilization, which is a first object. Various means in which a member which contacts the rotor physically and is locked thereto is provided to limit the amount of movement of the rotor, which is a second problem.

The rotor position stabilization method, which is the first object, is broadly classified into two types of methods: one method using a drive magnet, which is already available as one part of a driving mechanism; the other method using a dedicated thrust magnet.

The present invention provides various means in which locking members are provided to limit the movement of the rotor, which is the second object. Numerous means are provided mainly from the viewpoint of ease of assembly and movement limitation performance. As each of the means has advantages and disadvantages, a selection can be made depending upon the demand of the apparatus.

As numerous means can be provided in the present invention, individual specific means and their operation are explained at the same time to make understanding easier.

A first rotor position stabilization means uses the force of a magnetic attraction between a drive magnet and a stator core. A thrust bearing pressing force can be obtained by the magnetic attraction force generated when the axial relative positions of the drive magnet and the stator core are shifted from a neutral point at which no magnetic attraction force is generated. The neutral point refers to the positional relationship in which the two members are axially balanced with each other and no magnetic attraction force is generated. Since the rotor position stabilization means is formed merely by axially shifting the relative position of parts, which are already available as a drive mechanism, the position of the rotor can be stabilized by barely increasing the volume of the motor or the cost thereof.

A second stabilization means also uses a drive magnet, and a magnetic flux on the end surface thereof is used. The rotor is formed into substantially a cup shape, one end being closed and the other end open. A drive magnet is mounted inside the rotor. Ferromagnetic substances are positioned to closely oppose each other on the entire surface on the side on which the cup of the drive magnet is open. A thrust bearing pressing force can be obtained by the magnetic attraction force between the ferromagnetic substances. These ferromagnetic substances may be mounted in an enclosure or the like, or may be extended from the stator core. This construction hardly causes any increase in the volume of the motor.

A side effect may occur when the neutral points of the stator core and the drive magnet are shifted. The stator core has a slot for winding. Since the surface magnetic flux density of the drive magnet is not uniform, the magnetic attraction force along the thrust varies depending upon the rotational position of the drive magnet. Variations in the attraction force vibrates the disk or the enclosure, causing noise, which may exceed an allowable level depending upon the rigidity or resonance frequency of the apparatus.

In this connection, according to the present invention, an attraction force variation which is substantially equal to the variation amount of the attraction force and whose phase is inverted is generated between the drive magnet and the ferromagnetic substance. An excitation force thereof is erased by the attraction force variation in order to prevent noise from being generated.

Specifically, the object of the present invention is achieved by means, for example: a portion facing the end surface of the drive magnet of the ferromagnetic substances is non-uniform around the entire circumference thereof; the width between the ferromagnetic substances is varied; irregularities are axially provided; the flatness or inclination is controlled; the width of the opposite ferromagnetic substances is nonuniform and varied when seen rotationally; the facing area of the ferromagnetic substance is varied by making the ferromagnetic substance non-circular or by shifting the core; the ferromagnetic substance is not provided around the entire circumference in the direction of rotation, and separately provided or partially provided.

A third stabilization means is described below. A thrust magnet mounted on the end surface of the rotor (or stator) is used. A ferromagnetic substance is arranged on the surface of the rotor (or stator) which is axially and oppositely adjacent to the magnet. The mounting location may be any facing surface between the rotor and the stator, except the shaft. It is called a thrust magnet to clearly show that it has functions different from those of a cylindrical drive magnet which forms a main magnetic field. The expression that "a ferromagnetic substance is mounted in the stator" includes the circumstance in which the stator is formed of a ferromagnetic substance. Preferably the thrust magnet and the ferromagnetic substance are formed into a ring shape, though they may be formed into other shapes depending upon the case.

When a thrust magnet is magnetized at multipoles in the same manner as in the drive magnet, the magnetic field of the thrust magnet may cause core loss, causing increased torque loss. When a measure for this loss must be taken in the present invention, the thrust magnet does not have any changes in the magnetic poles in the direction of rotation. The thrust magnet appears as a ring shape when seen axially. A single pole in which NS poles are not switched rotationally is magnetized. However, it is difficult to form an effective magnetic path by the magnetization of a single pole alone, and the magnetic field could leak outside the motor. When the generation of a leakage flux presents a problem in the above-described manner, the thrust magnet is magnetized separately at multiple concentric poles to prevent leakage flux. Similarly, the drive magnet which forms the main magnetic flux may be hypothetically divided so that a region on the end surface is used as the thrust magnet.

The present invention provides various means in which a locking member is provided in order to limit the amount of movement of the rotor, which is the second object. Since each of these means has advantages and disadvantages, a selection can be made according to the demands of the apparatus.

The first movement limiting means is formed of an end surface having substantially a circular, continuous shape in the direction of the rotation of parts which form the motor, and a locking member arranged axially with a small clearance. If the locking member is arranged inside the motor, the construction of the motor becomes complex. Therefore, some contrivance is necessary for an assembly procedure. However, no matter where the rotor is positioned, it can be limited to one and the same amount of movement, and accordingly high reliability is achieved.

In one of the constructions for facilitating the assembly of the motor, when the rotor is inserted axially, a flange moves the locking member radially and elastically, and the rotor returns to its original position after it is inserted and engaged. A feature of this construction is that the locking member moves elastically. The assembly of the locking member is simple, although the construction thereof is complex.

In a second construction for facilitating the assembly of the motor, the locking member is rotatable and movable radially. After the rotor is inserted, the locking member is rotated and moved from outside the motor and engaged with the end surface of a flange or a groove. A feature of this construction is that the locking member can be rotated and moved from outside the motor. In the same manner as described above, the assembly of the locking member is simple, although the construction of the locking member is complex.

In a third construction, a locking member or the like mounted in the stator is engaged with the flange or groove of the motor beforehand, and the locking member fixedly secured to a mating stator member after the rotor is inserted, thus forming a locking construction. There is a contrivance, for example, a small hole opened in a portion of the motor, for accessing the locking member from outside the motor.

The second movement limiting means is formed of an end surface of an irregular flange having various radiuses in the direction of rotation of parts which form the motor, and locking members which are axially and closely positioned to face each other. With this construction, the rotor cannot be inserted unless it is set in a fixed direction. After insertion, it cannot be easily removed unless the angle is matched. One or many irregular portions may be provided.

A mechanism formed of this irregular shape has been developed, and a spiral approach portion is provided on the flange and/or the locking member. As one arrangement of this construction, the flange and the locking member are formed into a male and a female screw. The direction of the screw winding is such that the rotor can be inserted in the same direction it rotates during operation. With this construction, the rotor cannot be removed unless it is rotated reversely.

The third movement limiting means is constructed in such a way that a stationary member which engages on the rotor extends from the stator of the motor, and closely faces the rotor. In this construction, it is difficult to lock the center of the rotor, but it is easy to mount the locking member.

The fourth movement limiting means has a construction in which one wall surface of an enclosure is arranged to closely and axially face the rotor. The wall surface is arranged near the central portion of the rotor with a small clearance along the thrust. A clearance adjustment mechanism is provided in the rotor's rotary shaft abutment portion on the wall surface as required to adjust an allowable amount of movement. In this construction, rigidity sufficient to limit the rotor movement is required of the enclosure. It is possible to easily lock the movement of the rotor at the relative center thereof.

Terms used will now be explained. The motor is formed of a rotor and a stator. The rotor refers to the whole rotary portion of the motor, and the stator refers to the other stationary portion. There are portions describing the locking member as provided in the stator, and the flange as formed in a portion of the rotor as regards the movement limiting construction for the convenience of explanation. This rotation or rest-condition expresses only the relative movement of two members. Whether the flange is on the rotor or stator, the present invention is essentially the same.

Many means have been explained in the above description. The position of the rotor can be stabilized by these means and a rotor movement limiting means is provided so that support performance equivalent to a two-surface opposing type thrust bearing can be obtained by a single-surface opposing type bearing.

The above and further objects and novel features of the invention will be more apparent from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Preferred embodiments of the present invention will be explained below with reference to the accompanying drawings.

Figure 14A:
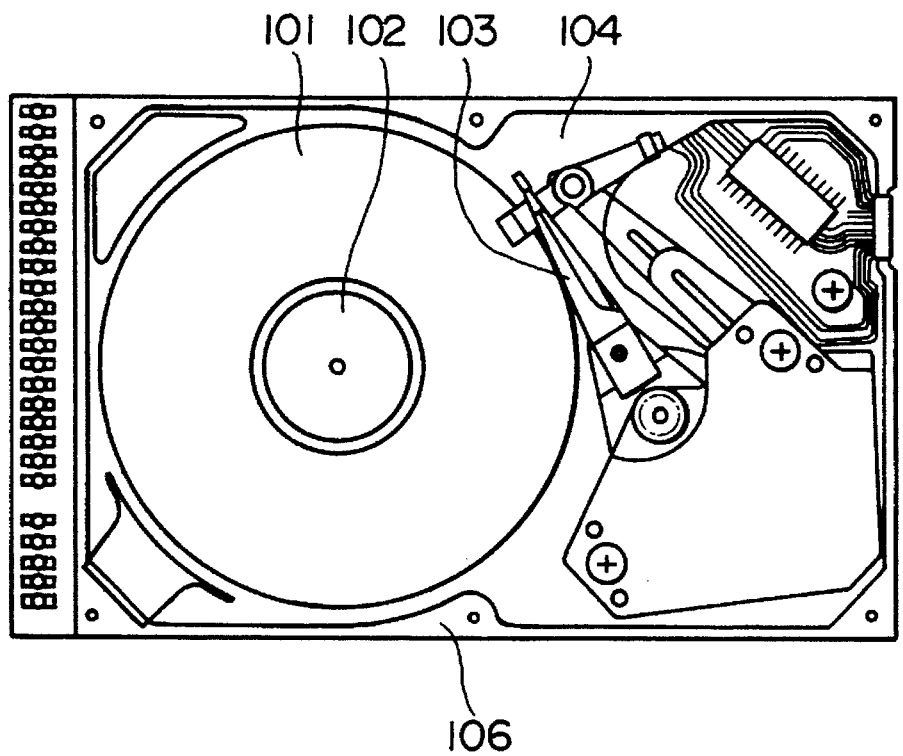
FIG. 14A is a plan view of a magnetic disk driving apparatus manufactured by U.S. PrairieTec Co., Ltd.
Figure 14B:
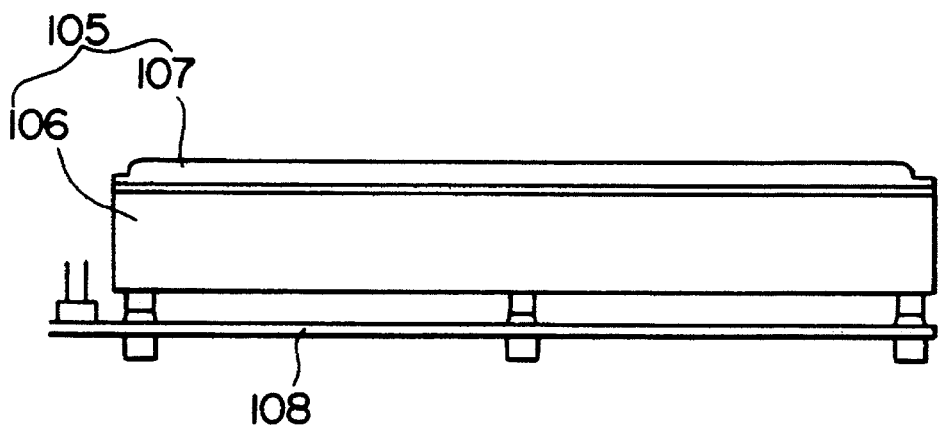
FIG. 14B is a side view of the disk driving apparatus of FIG. 14A.

An example of a disk driving apparatus is shown in FIGS. 14A and 14B. The present invention has been accomplished with a view toward applying it to the field of disk driving apparatuses. A disk 101 of this apparatus is driven to rotate by a motor 102. Information is recorded and reproduced by a head 104 mounted in the extreme end of an actuator 103. The above members are housed in an enclosure 105 formed of a base 106 and a cover 107, and are controlled by an interface circuit 108.

[First Embodiment]

Figure 1A:
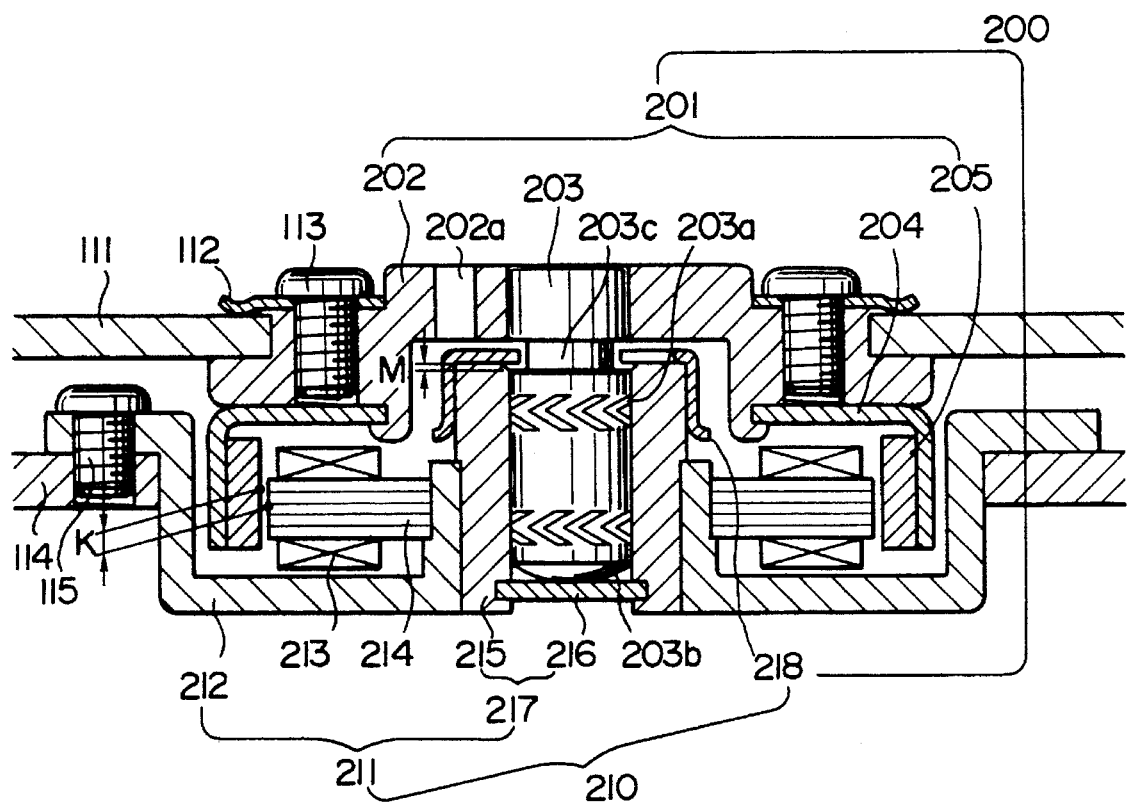
FIG. 1A is a sectional view of a peripheral portion of a motor in accordance with a first embodiment of the present invention.
Figure 1B:
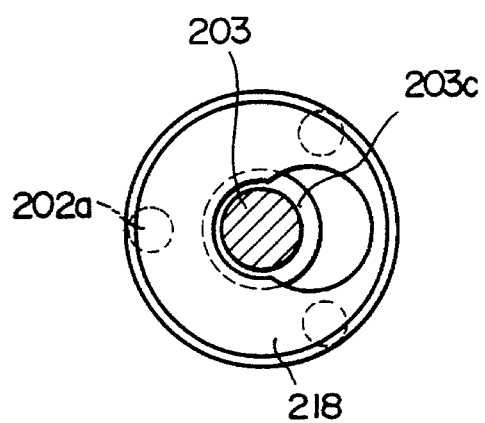
FIG. 1B is a plan view of a rotor locking construction when it is seen with the upper portion of the rotor being cut away.

FIGS. 1A and 1B illustrate a peripheral portion of a motor which is the primary component of the present invention. An outline of the motor will be explained first from the viewpoint of its functions. A disk 111 is fixed to a rotor 201 of the motor by means of a clamp ring 112 and a screw 113. The rotor 201 is radially supported by a hydrodynamic bearing mechanism and axially supported by a thrust bearing mechanism so as to rotate. The bearing mechanism is fixed to a bracket 212 at its one end, and the bracket 212 is fixed to a base 114 by means of a screw 115. The driving mechanism is inside the rotor 201 on the outer circumference of the bearing mechanism and drives the rotor 201.

A shaft 203 is mounted in the center of a hub 202 by which the disk 111 is mounted. The shaft 203 rotates together with the hub 202 and the disk 111, and forms the rotational center thereof. The shaft 203 is radially supported by a sleeve metal 215 and supported along the thrust by a thrust plate 216. The sections between the shaft 203 and the sleeve metal 215, and between the shaft 203 and the thrust plate 216 are filled with a lubricating fluid, for example, oil (no reference numeral is given because an illustration thereof is difficult). A herringbone groove 203a is formed in the shaft 203, so that pressure is generated in the lubricating fluid when the shaft 203 rotates, thus forming a hydrodynamic bearing mechanism. On the other hand, a shaft end surface 203b and the thrust plate 216 form a thrust bearing mechanism while they are prevented from being worn by the lubricating fluid filled therebetween.

The rotation driving force of the motor is generated by a rotating magnetic field generated by a stator coil which is wound around a stator core 214 and powered and magnetized, and a drive magnet 205 magnetized at multiple poles, which surrounds the periphery thereof. The drive magnet 205 is fixed to the inner circumference of a rotor frame 204, and the rotor frame 204 is fixed to the hub 202. These members form a rotor 201 as a whole and rotate. A stator core 214 is fixed to the bracket 212, forming a source for generating a driving force.

A means for stabilizing the axial position of the rotor 201 will now be explained. In FIG. 1A, the drive magnet 205 and the stator core 214 are positioned by shifting their relative axial positions by a dimension K from the neutral point of the magnetic attraction force. Thus, a thrust bearing pressing force is obtained. With this construction, a component force along the thrust generated between the stator core 214 and the drive magnet 205 acts to press the shaft end surface 203b against the thrust plate 216, preventing the rotor 201 from axially moving unstably. If the vibration resistant acceleration required for the apparatus at the time is denoted as G, it is preferable that a lower limit of the thrust bearing pressing force be set at a value larger than such a value as the mass of the rotor 201 plus the disk 111, multiplied by G. The upper limit value is determined mainly on the basis of whether or not the thickness of the space enclosing the lubricating fluid of the thrust bearing can be maintained, that is, on the basis of the service life.

Next, a means for limiting the axial movement amount of the rotor 201 will be explained. Since this is related to the procedure for assembling a motor, the relationship among parts will be explained again from the viewpoint of the procedure.

The stator core 214 around which the stator coil 213 is wound, one of the parts which form the stator 210, is fixed to the bracket 212 beforehand. The thrust plate 216 is fixed to the lower end surface of the sleeve metal 215, thus forming a metal assembly 217. This metal assembly 217 is inserted into the central hole of the bracket 212 and fixed by bonding, thus completing a lower assembly 211.

In the shaft 203, one of the parts which form the rotor 201, one end thereof is fixed firmly to the central hole of the hub 202 by using a means such as shrinkage fitting. The locking projection of the hub 202 is inserted into the corresponding hole in the inner periphery of the rotor frame 204, and fixed firmly by means such as caulking. Further, the drive magnet 205 is fixed to the inner side of the rotor frame 204 by bonding or the like. Thereafter, a cap 218 is inserted from the free end of the shaft 203 into the locking groove 203c in the innermost portion, thus forming an upper assembly 200.

Next, a proper amount of lubricating fluid is injected inside the metal assembly 217 of the lower assembly 211, and then the free end of the shaft 203 of the upper assembly 200 is inserted therein. At that time, as the cap 218 has such a dimension to have an interference allowance with the outer periphery of the sleeve metal 215, a press bar (not shown) is inserted through three small holes 202a provided in the hub 202, and is pressed until the cap 218 contacts the end surface of the sleeve metal 215. Thus, the assembly of the motor is completed.

As for the motor manufactured in this way, the amount of the axial movement of the rotor 201 is limited by the size of the gap M because the end surface of the locking groove 203c of the shaft opposes the cap 218 at gap M. The amount of movement permits the rotor 201 to rotate and prevents the apparatus from being damaged. Specifically, referring to FIGS. 14A and 14B, since an object is to prevent the rotor 201 and the rotor head 104 from being damaged, or prevent an actuator 103 from being deformed, it is preferable for the amount of movement to be in a range from 0.005 to 0.5 mm, and more preferably from 0.005 to 0.15 mm, though it depends upon the specification of the apparatus.

[Second Embodiment]

An explanation will be given below of various examples of means for stabilizing the axial position of the apparatus and means for limiting the amount of the axial movement of the rotor. However, the above two means will not be explained in one embodiment to avoid unnecessary complexity and difficulty in comprehension.

Figure 2A:
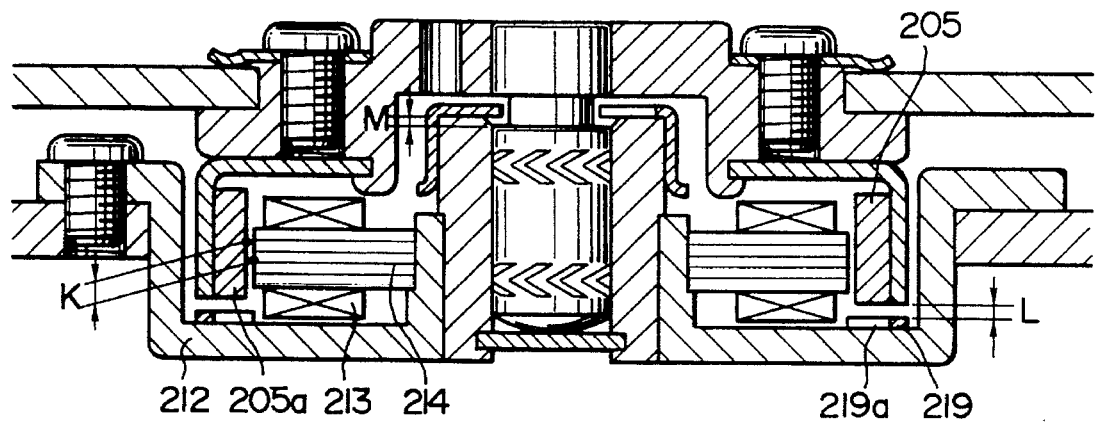
FIG. 2A is a sectional view of a peripheral portion of a motor in accordance with a second embodiment of the present invention.
Figure 2B:
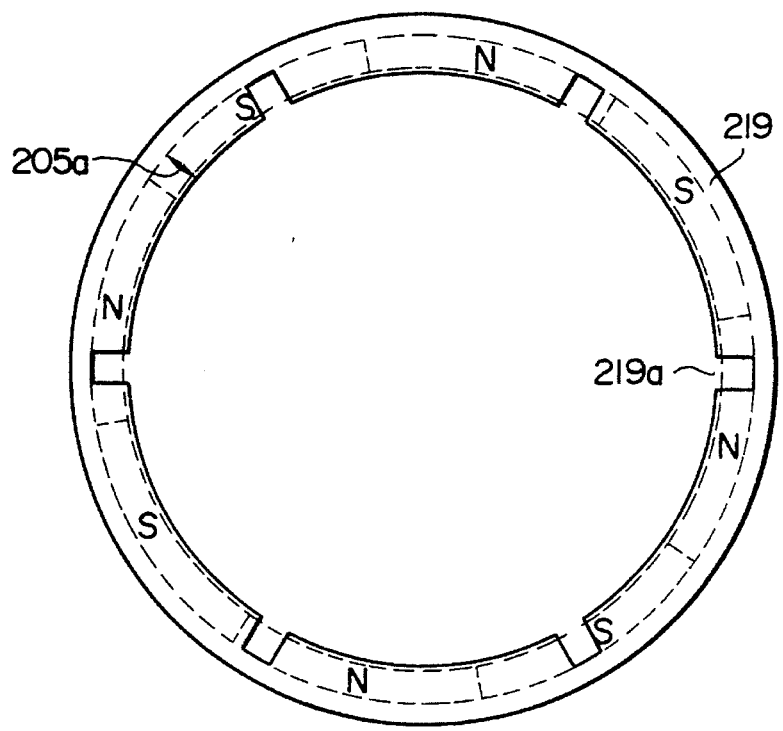
FIG. 2B is a plan view illustrating a ferromagnetic ring of the motor stacked on a drive magnet (indicated by a dotted line)

FIGS. 2A and 2B illustrate a second means for obtaining a magnetic attraction force. In addition to the parts arranged in FIGS. 1A and 1B, a ring 219 formed from a ferromagnetic substance is placed at a gap L at a position where it closely opposes an end surface 205a of the drive magnet of the bracket 212.

In FIG. 2B, the end surface 205a of the drive magnet is magnetized at eight poles as indicated by concentric dotted lines. The stator core 214, on the other hand, has, for example, six slots (cut) though these are not shown. Therefore, when the drive magnet 205 rotates around the stator core 214, usually the attraction force in the direction of rotation varies (called cogging). Twenty-four (24) variation components (the lowest common multiple of the number of slots and the number of magnetized poles) are often contained in one rotation. When a deviation of the dimension K is provided as shown in FIG. 2A, the axial attraction force thereof varies in the same manner as in the direction of rotation. It is assumed in this embodiment that 24 variations occur axially. However, even if the vectors in the rotational direction of the attraction force cancel with each other, the vectors along the axis do not cancel each other. Therefore, variations in the rotational direction are not necessarily proportional to variations along the axis.

As shown in FIG. 2B, six (6) notches 219a are provided in the ring 219. Attraction force variations are produced 24 times for one rotation by the notches 219a between the end surface 205a of the drive magnet and the notches 219a. They are combined with respect to the above-mentioned variations after the phase thereof is inverted, and cancelled.

Various constructions are used for providing a function for varying an attraction force to a ferromagnetic substance opposing the end surface of the drive magnet. Since the frequency and the size of variation components to be erased are various, the shape of a ferromagnetic substance to be used is complex and varied. For example, depending upon the construction, there may be irregularities, inclinations, the flatness may be adjusted, the width may be nonuniform, and the ferromagnetic substance may be deformed, eccentric, divided, or partially provided. Naturally, when an allowable vibration and noise level is higher than the level of the vibration generated, it is unnecessary to cancel variations, and use of only a function for supplying the magnetic attraction force of the present invention is sufficient.

[Third Embodiment]

Figure 3A:
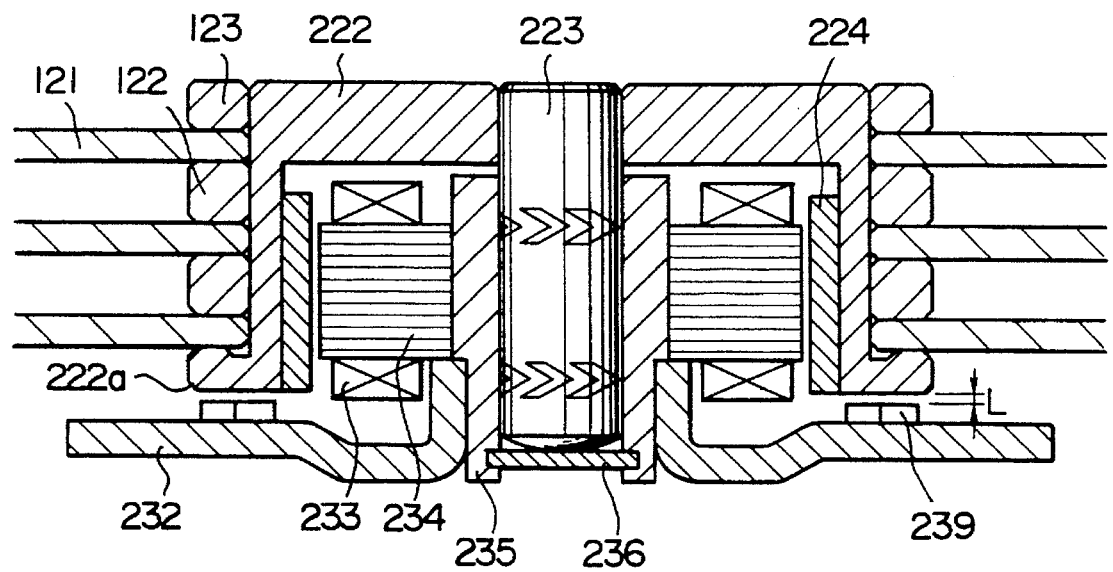
FIG. 3A is a sectional view of a peripheral portion of a motor in accordance with a third embodiment of the present invention.
Figure 3B:
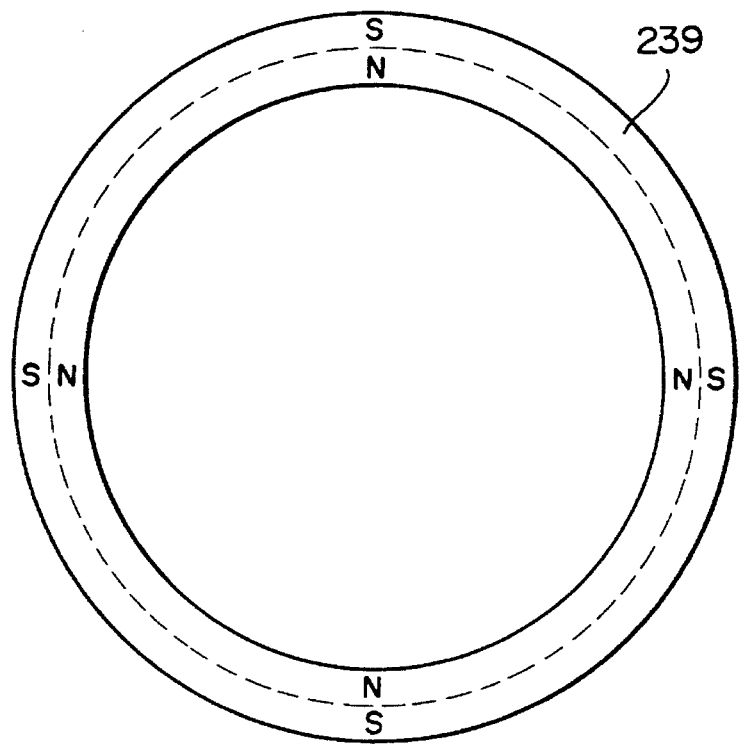
FIG. 3B is a plan view illustrating only a thrust magnet of the rotor.

FIGS. 3A and 3B illustrate the third stabilization means. In this embodiment, a disk 121 is fixed to a hub 222 formed from a ferromagnetic substance by use of a spacer ring 122 and a clamp ring 123. A bracket 232 is also formed from a ferromagnetic substance. In addition, the third stabilization means has a shaft 223, a drive magnet 224, a stator coil 233, a stator core 234, a sleeve metal 235, and a thrust plate 236, as in the above-described embodiments.

In this embodiment, a ring-shaped thrust magnet 239 is positioned at a gap L so that it is close to an end surface 222a of the hub and opposite thereto. The thrust magnet 239 is rotationally magnetized at a single pole in which no magnetic poles are switched and radially magnetized separately at two concentric poles, as shown in FIG. 3B. With such magnetization, an eddy current generated in the opposing ferromagnetic substances (the end surface 222a of the hub) is small because there are no changes at the magnetic poles in the direction of rotation. If the two concentric poles are magnetized, a compact, strong magnetic path can be formed easily. A desired magnetic attraction force can be obtained, and a leakage magnetic field caused by the thrust magnet 239 can be reduced.

[Fourth Embodiment]

Figure 4:
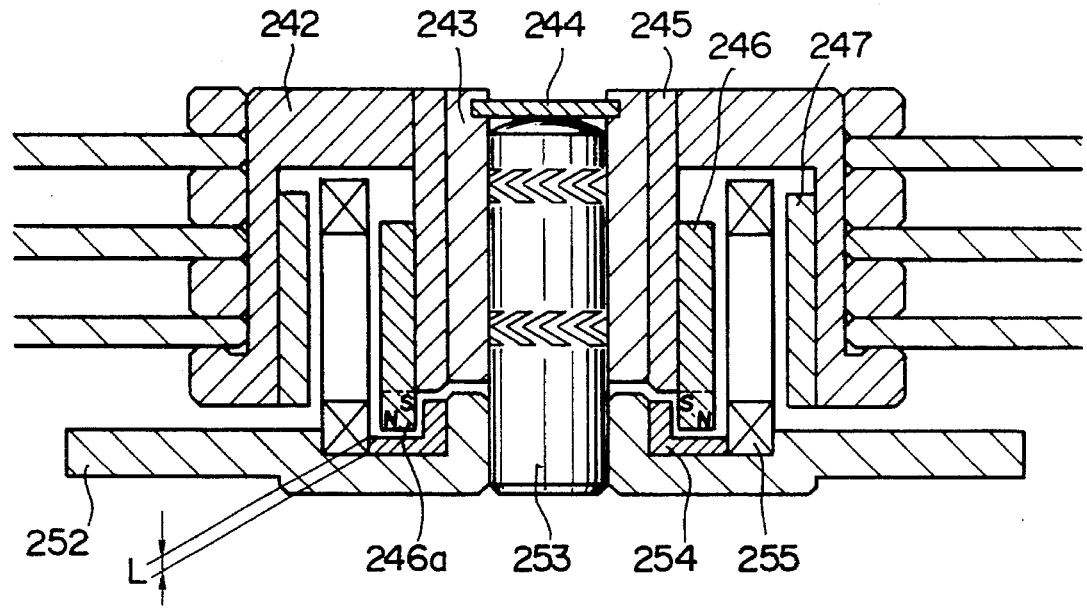
FIG. 4 is a sectional view of a peripheral portion of a motor in accordance with a fourth embodiment of the present invention.

Still another embodiment of a stabilization means will be described. FIG. 4 illustrates an example in which the present invention is applied to a peripheral opposing magnetic-field type coreless motor in such a way that a cylindrical drive magnet for a main magnetic field is hypothetically divided in two, an end surface on the bracket of the magnet being used as a thrust magnet.

In FIG. 4, a shaft 253 is fixed to a bracket 252. A sleeve metal 243 is placed around the outer periphery thereof. A thrust plate 244 is placed above the shaft 253, and a lubricating fluid is injected into the clearance between them, thus forming a hydrodynamic bearing mechanism and a thrust bearing mechanism.

A stator coil 255 fixed to the bracket 252 is formed into a cylindrical shape in which a plurality of hollow coils are arranged circumferentially and firmly fixed. A similarly cylindrical drive magnet 246 is circumferentially magnetized at multiple poles. An inner cylinder 245 and an outer cylinder 247, both of which are formed from a ferromagnetic substance, serve as a magnetic path for forming a magnetic field. The driving force for rotating the motor is generated by a rotational force generated between a rotating magnetic field which is produced when an electric current is supplied to the stator coil 255 and a magnetic field produced by the drive magnet 246.

An end surface 246a of the bracket of the drive magnet 246 is circumferentially magnetized at a single pole and used as a thrust magnet. A compact, closed magnetic path is formed between the thrust magnet and a ferromagnetic substance 254 which is fixed to the bracket 252 and is opposite thereto in an air gap L. As shown in FIG. 4, portions of the magnetic path may oppose radially.

[Fifth Embodiment]

Next, several means for limiting the amount of an axial movement of the rotor will be explained.

Figure 5:
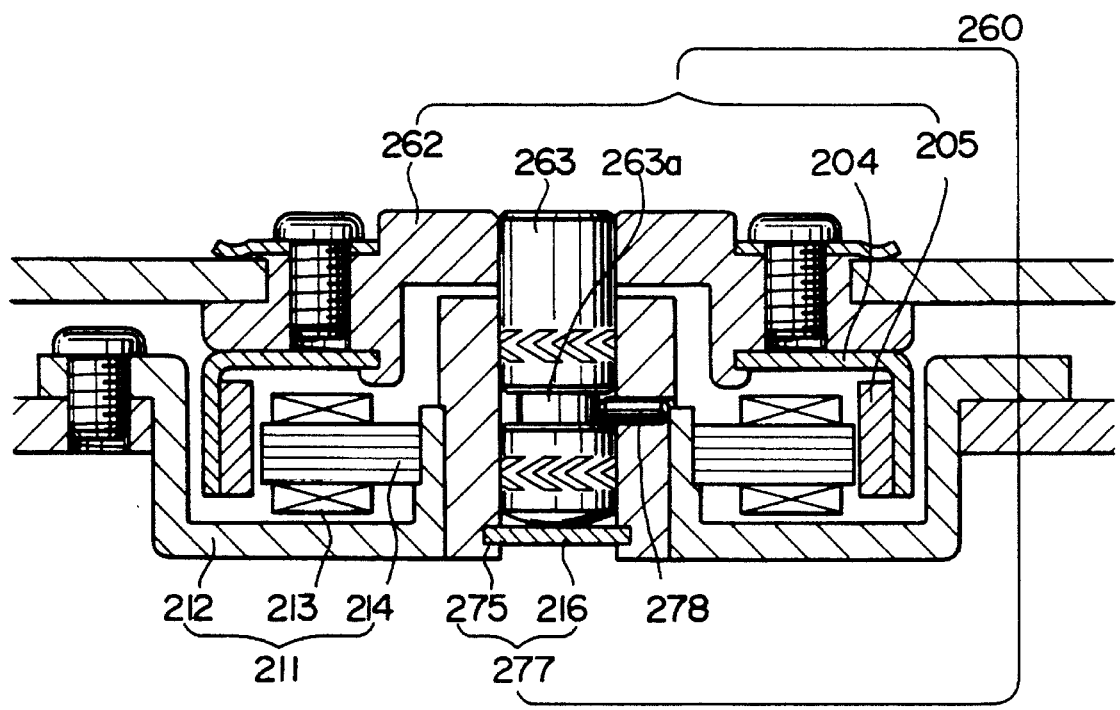
FIG. 5 is a sectional view of a peripheral portion of a motor in accordance with a fifth embodiment.

Unlike the case of FIGS. 1A and 1B, FIG. 5 illustrates a case in which a rotor locking mechanism is completed at the stage of the upper assembly 260. As for the series of movement limiting means in accordance with the present invention, a construction suitable for making the axial length of the hydrodynamic bearing as long as possible to improve the support rigidity thereof is shown. Since the axial central portion of the hydrodynamic bearing often does not contribute to support rigidity, an intermediate portion thereof may be used as a locking construction. This embodiment is concerned with this construction.

A locking groove 263a is provided near the axial center of a shaft 263 mounted in the center of the hub 262. A metal assembly 277 is inserted into the shaft 263. A locking pin 278 is inserted into a hole at a position corresponding to the locking groove 263a of the sleeve metal 275, thus forming a rotor locking mechanism. The upper assembly 260 formed in this way is inserted into the lower assembly 211 which has been prepared previously and firmly fixed, thus forming the motor.

[Sixth Embodiment]

Figure 6A:
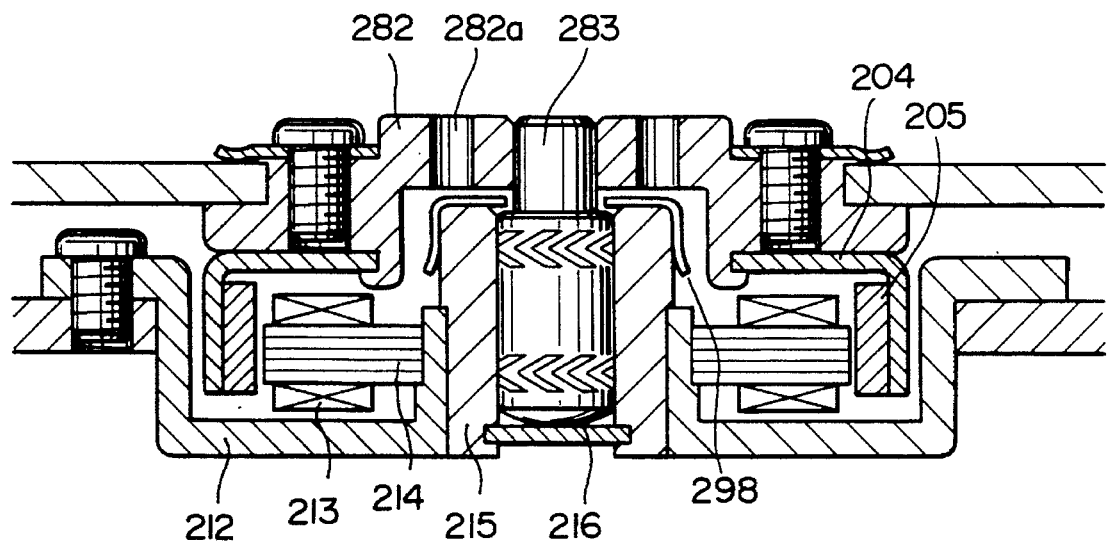
FIG. 6A is a sectional view of a peripheral portion of a motor in accordance with a sixth embodiment of the present invention.
Figure 6B:
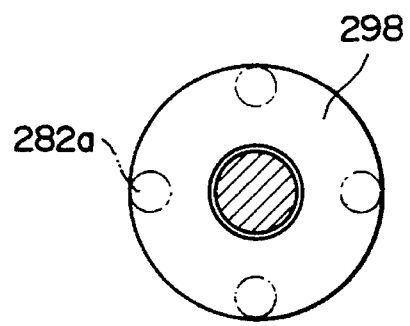
FIG. 6B is a plan view of a rotor locking construction when it is seen with the top portion of the rotor being cut away.

The shapes of the top of a shaft 283 and the hole in a cap 298 in FIGS. 6A and 6B are different from those in FIGS. 1A and 1B. In this embodiment, the cap 298 must be placed in position before the shaft 283 is firmly fixed to the hub 282. To assemble the cap 298, the cap is pressed through a small hole 282a of the hub by using a press bar in the same manner as in FIGS. 1A and 1B. A feature of this construction is that the locking can be performed around the entire circumference of the shaft.

In this embodiment, a method may be adopted in which the shaft 283 is connected to the hub 282 in the final step for assembling the motor. In this case, the cap 298 can be mounted in a condition in which there is no hub. However, since the shaft 283 must be connected to the hub 282 strongly and precisely by shrinkage fitting or bonding, this connection is preferably performed in the first step.

[Seventh Embodiment]

Figure 7A:
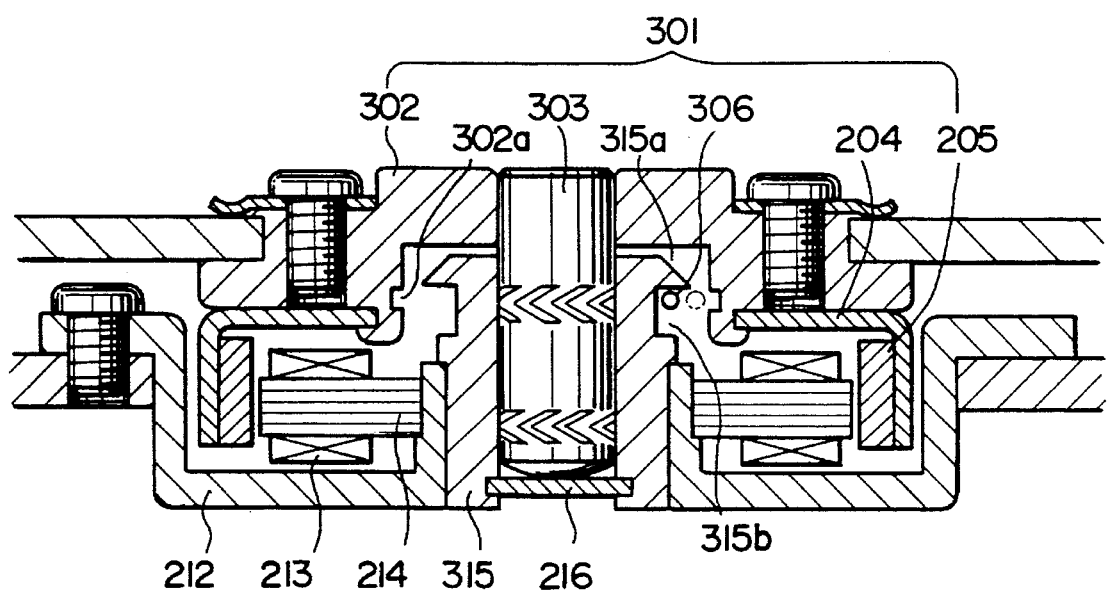
FIG. 7A is a sectional view of a peripheral portion of a motor in accordance with a seventh embodiment of the present invention.
Figure 7B:
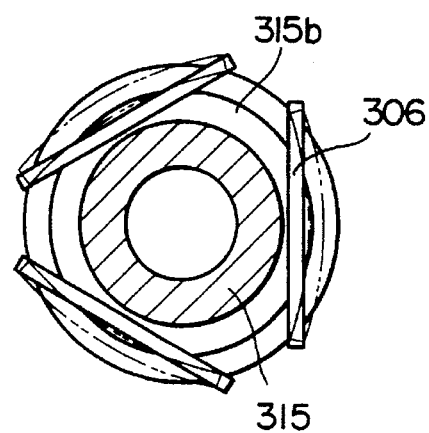
FIG. 7B is a plan view of a rotor locking construction when it is cut away at the position of a locking pin.

FIGS. 7A and 7B illustrate an example in which the assembly of a rotor locking construction is completed by merely inserting a rotor 301, which operation is more simple than in the above case. A recess 302a is provided on the inner peripheral surface of a hub 302, and an elastically deformable locking pin 306 is inserted into the recess 302a. A conical surface 315a and a groove 315b to be engaged with the locking pin 306 are provided on the outer periphery of a sleeve metal 315 at the upper end thereof. When the rotor 301 is inserted from above, the locking pin 306 is deformed and enlarged along the outer circumference by the conical surface 315a. When the rotor 301 is further pressed and inserted, after the locking pin 306 passes the largest outer diameter portion of the conical surface 315a, it falls into the groove 315b and returns to its original form, thus completing locking. Since the locking member is permitted to be deformed in this construction, locking accuracy is in principle worse than in the above constructions. However, less time is required for assembly of the motor.

[Eighth Embodiment]

Figure 8A:
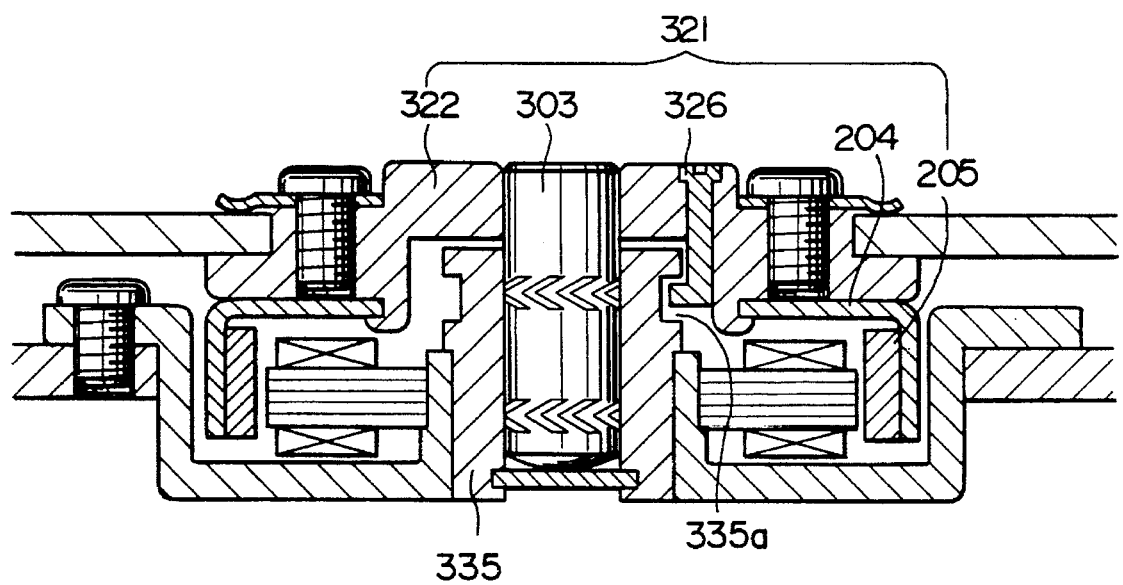
FIG. 8A is a sectional view of a peripheral portion of a motor in accordance with an eighth embodiment of the present invention.
Figure 8B:
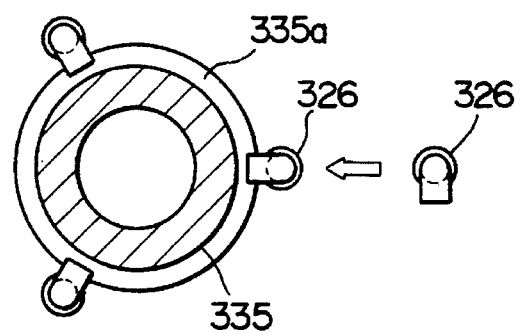
FIG. 8B is a plan view of a rotor locking construction when it is cut away at the position of a locking groove and seen from the bottom.

FIGS. 8A and 8B illustrate an example in which a locking member can be rotated and moved from outside the motor. Three locking pins 326 are mounted in a hub 322 beforehand, which locking pins can be rotated through the top of the hub 322. After a rotor 321 is inserted, the direction of the locking pins 326 is turned so the pins engage with a groove 335a of a sleeve metal 335, thus forming a locking construction.

[Ninth Embodiment]

Figure 9A:
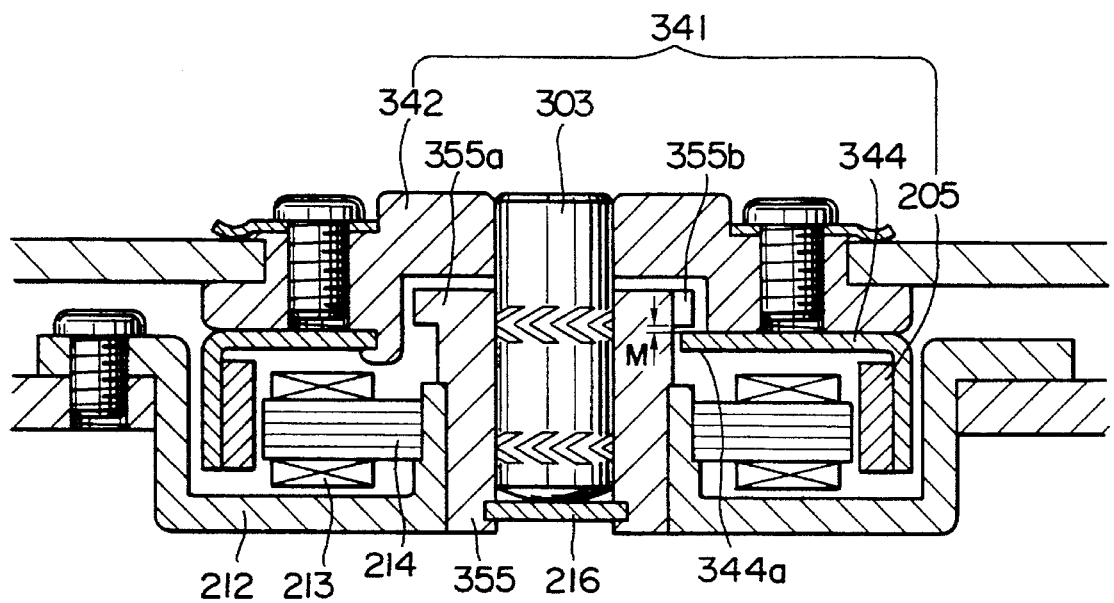
FIG. 9A is a sectional view of a peripheral portion of a motor in accordance with a ninth embodiment of the present invention.
Figure 9B:
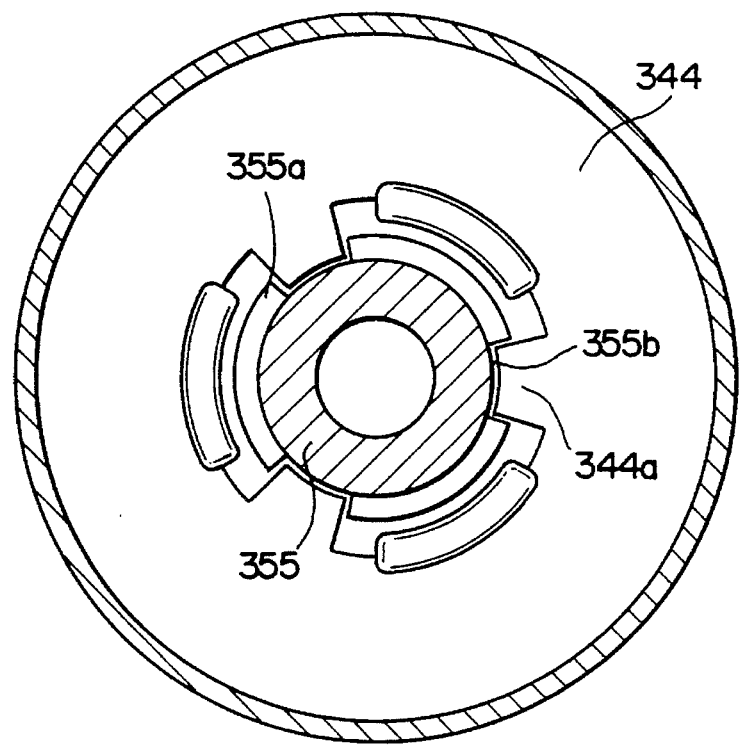
FIG. 9B is a plan view of a rotor locking construction when it is cut away at the position of a locking groove and seen from the bottom.

FIGS. 9A and 9B illustrate an example in which irregularities are provided on two locking members, and a rotor locking mechanism and rotor assembly are completed by merely inserting a rotor 341.

A flange 355a for locking purposes is provided in the upper end of a sleeve metal 355, a recess 355b being formed in a portion thereof. A projection 344a having a shape corresponding to the recess 355b is provided on the inner periphery of a rotor frame 344. The projection and recess are formed so that they pass through each other when the direction of the rotor 341 is set appropriately. With this construction, the assembly of a motor is completed by merely inserting the rotor 341, and thus the assembly of the locking construction is completed. Although this construction has a drawback in that the rotor cannot be locked when the rotor is positioned to face a certain direction, it is very easy to assemble the motor.

[Tenth Embodiment]

Figure 10:
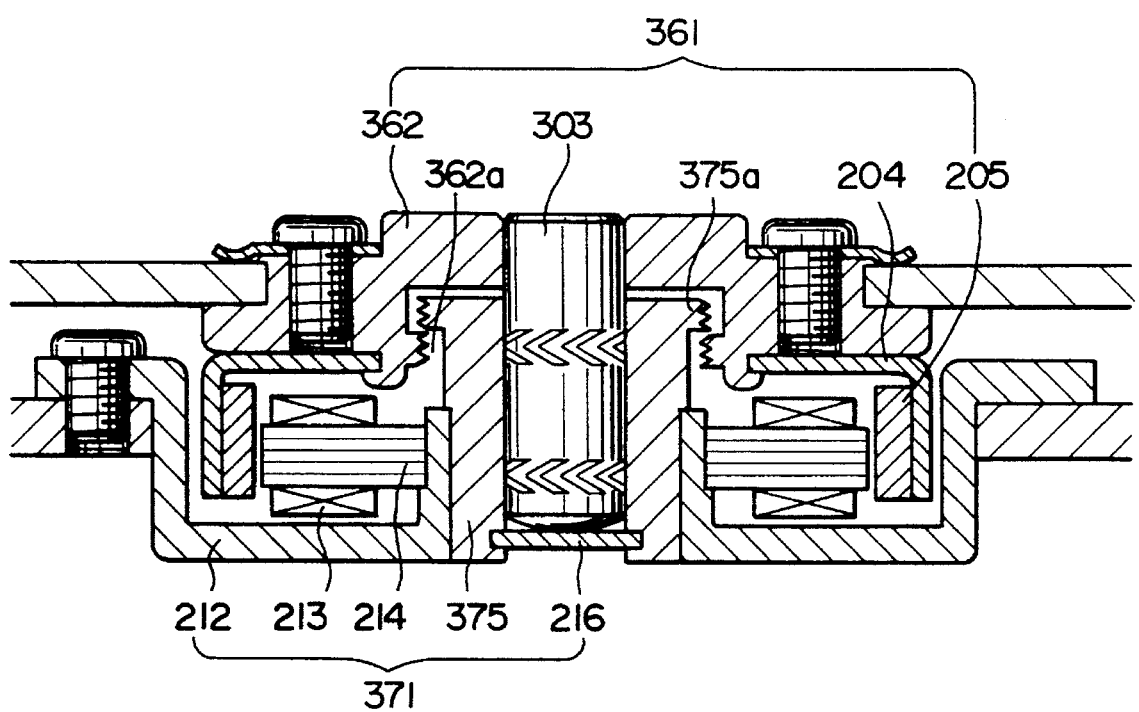
FIG. 10 is a sectional view of a peripheral portion of a motor in accordance with a tenth embodiment of the present invention.

FIG. 10 illustrates that the locking member of the rotor and the stator have the relationship of a male and a female screw. A male screw 375a is formed in a sleeve metal 375, and a female screw 362a is formed in a hub 362. When a rotor 361 is inserted into a stator 371, the rotor is rotated and screwed to be assembled. As in this construction projections and recesses are provided in the locking member, this construction has a drawback in that locking dimensions vary depending upon the rotational position of the rotor. However, this construction has an advantage in that, in addition to it being very easy to assemble the rotor, the motor will not be displaced as long as the rotor rotates in the direction in which it was rotated during insertion.

[Eleventh Embodiment]

Figure 11A:
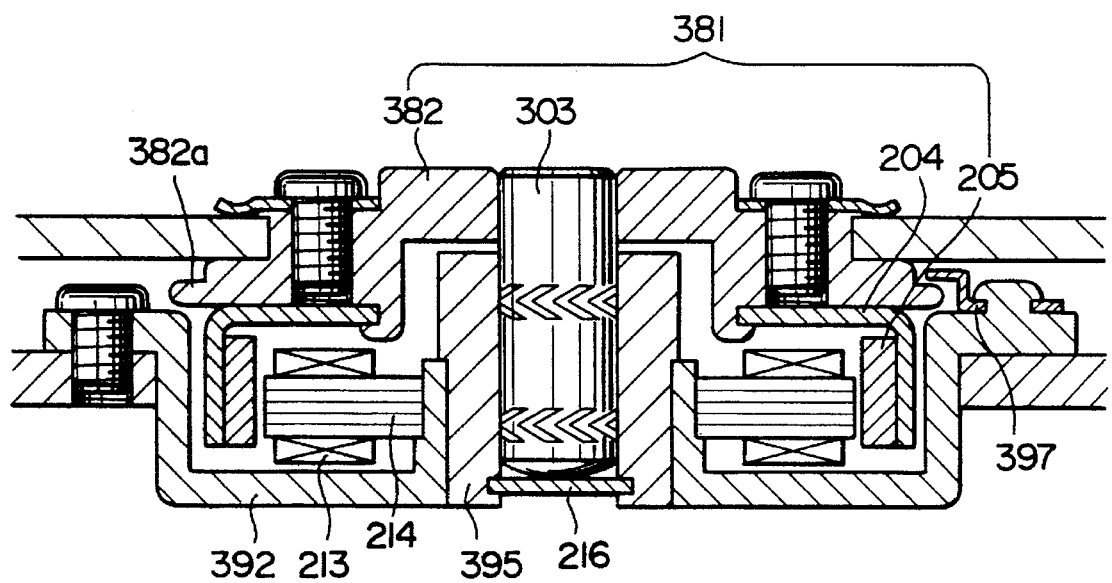
FIG. 11A is a sectional view of a peripheral portion of a motor in accordance with an eleventh embodiment.
Figure 11B:
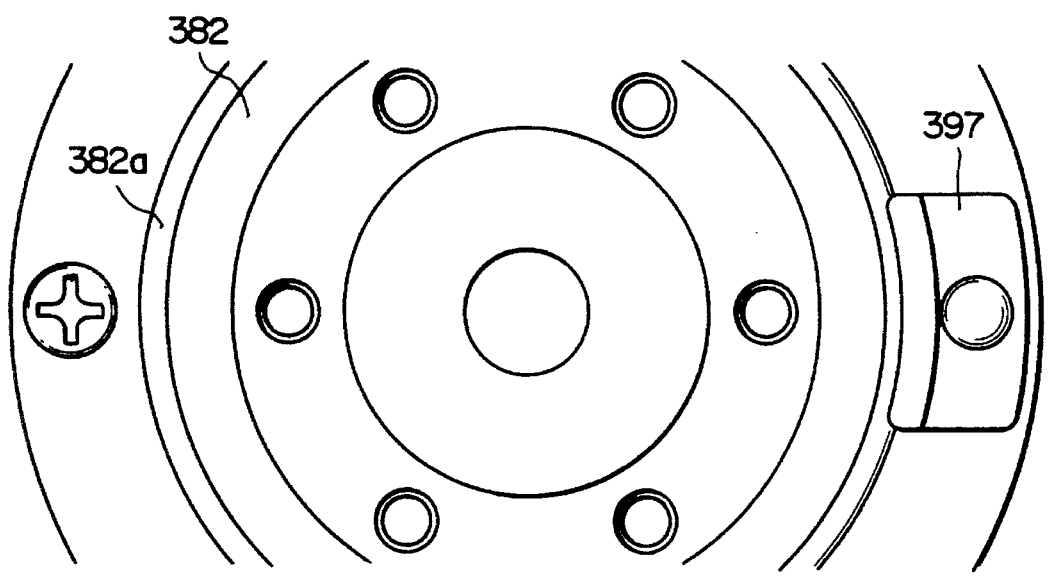
FIG. 11B is a plan view of a rotor locking construction when it is seen from the top of the rotor.

A construction in which the rotor is locked from outside the motor will be described in this and the following embodiments. FIGS. 11A and 11B show that an end surface 382a of the outermost circumference of a hub 382 is used for a locking construction. A locking member 397 is connected to a bracket 392, thereby preventing the rotor 381 from being displaced. In this construction, it is difficult to lock a portion near the inner periphery of the rotor, but it is very easy to assemble the motor.

[Twelfth Embodiment]

Figure 12:
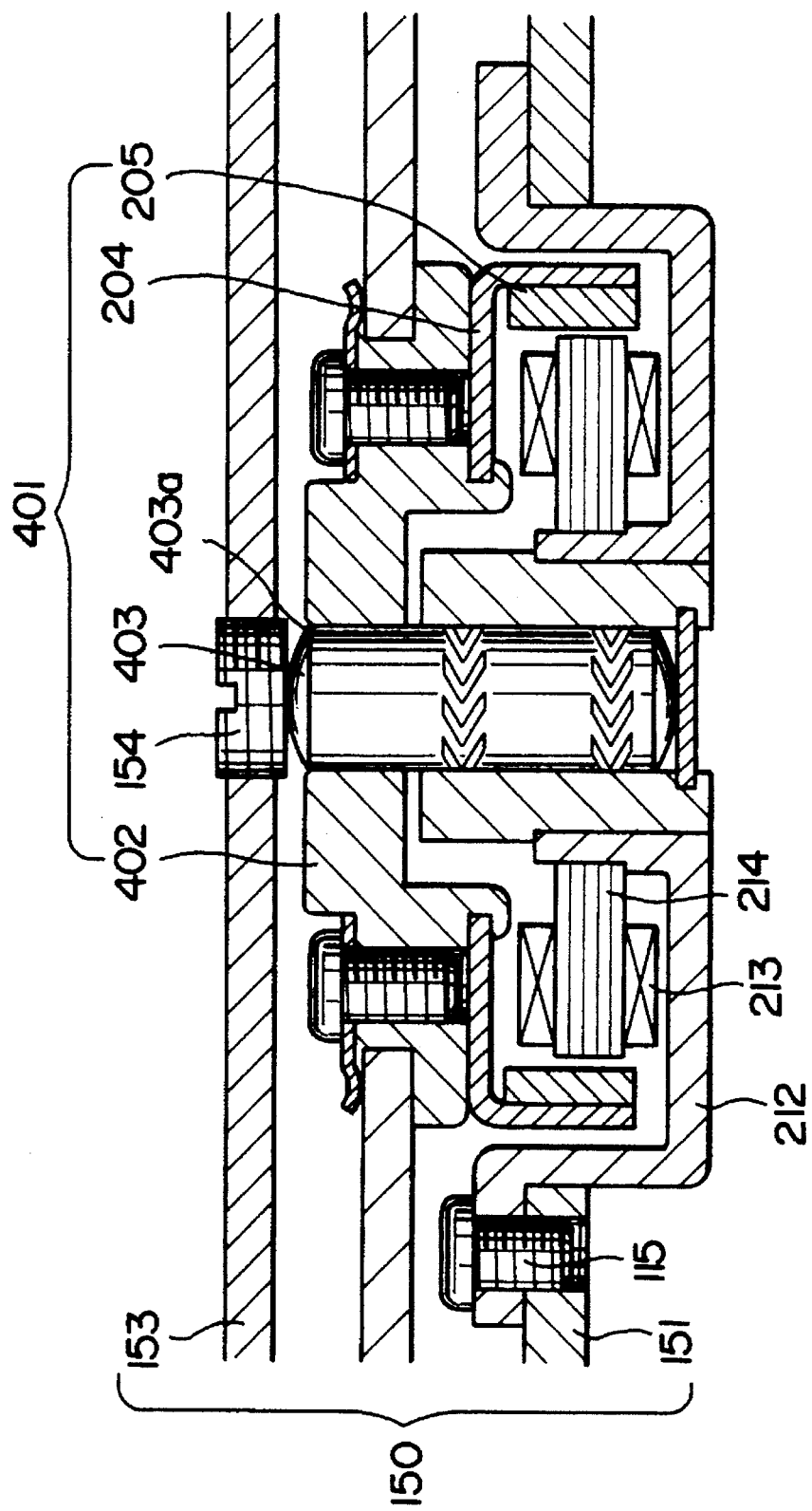
FIG. 12 is a sectional view of a peripheral portion of a motor in accordance with a twelfth embodiment of the present invention.
Figure 13A:
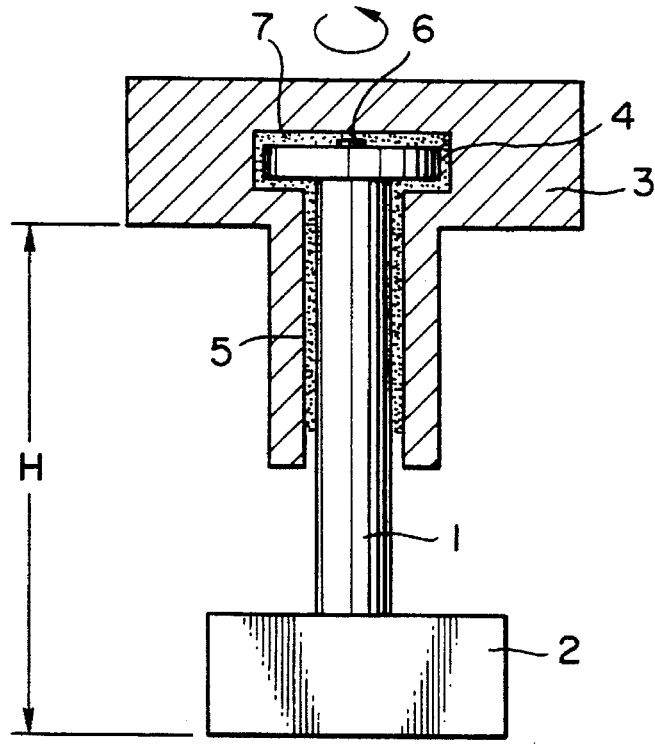
FIG. 13A is a sectional view of a conventional two-surface opposing type thrust bearing.
Figure 13B:
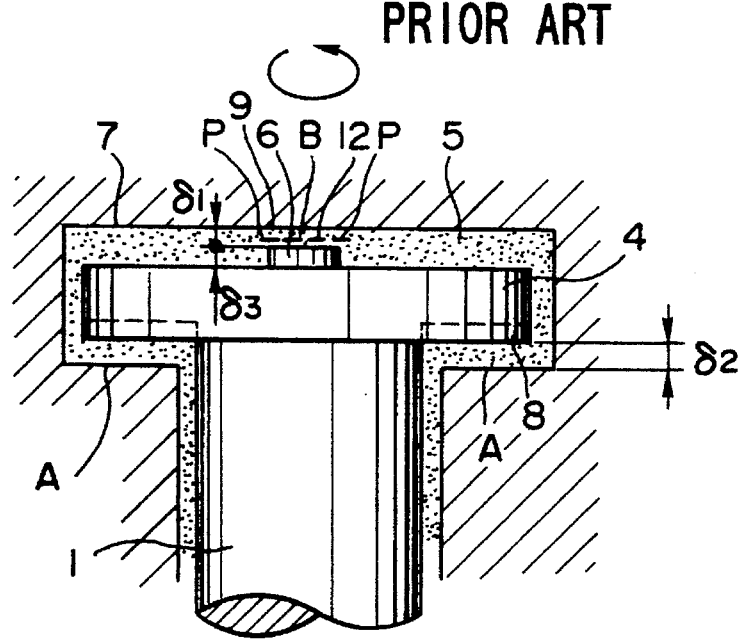
FIG. 13B is a partially enlarged sectional view of the thrust bearing of FIG. 13A.

Lastly, an explanation will be given of a construction in which the amount of the movement of the rotor is limited by using an enclosure. In an example of FIG. 12, an enclosure 150 is formed of a base 151 and a cover 153. The cover 153 is positioned closely to a central portion 403a of a rotor 401 so that locking is performed. This construction has a drawback in that if the enclosure 150 itself does not have rigidity, it is difficult to achieve rotor locking rigidity, and locking accuracy is not good. However, this construction has an advantage in that the rotor can be locked at the central portion thereof. A first feature of this construction is that the center of gravity of the rotor 401 can be supported. A second feature thereof is that, since a relative slip speed during locking contact is small, wear occurs less than usual and there is only a small decrease in the number of rotations.

In this embodiment, a clearance adjustment mechanism using a screw 154 is additionally provided in the rotor abutment portion of the enclosure 150. As the enclosure 150 is a relatively large part, it is difficult to obtain parts which accurately correspond to desirable locking dimensions, thus often making use of such an adjustment mechanism necessary.

Although many embodiments have been described above, the present invention is, of course, not limited to the embodiments described above. Terms such as a ring, groove, flange, cap, pin or screw have been used to explain a magnetic attraction force generating mechanism and a rotor locking mechanism. These names and shapes have been selected with regard to a method of manufacturing members or surrounding construction, and therefore the present invention is not limited by these names and shapes. As regards at what portion of the motor the mechanism is formed, various modifications can be made depending upon the required specifications of the motor or apparatus.

As is apparent from the above-described embodiments, according to the present invention, two objects, rotor position stabilization and rotor movement limitation, can be achieved. As a result, a thrust bearing mechanism simple in construction can be formed using a single surface opposing type thrust bearing. In addition, advantages such as low height, simplicity in construction, low price and low consumption of power can be realized while a satisfactory thrust support performance which can be obtained by substituting a single surface opposing type thrust bearing for a two surface opposing type thrust bearing. In particular, the feature of low height is extremely advantageous when a hydrodynamic bearing is used in a thin type apparatus.

According to the present invention, as described above, a motor utilizing to the fullest degree the features in principle of a hydrodynamic bearing, such as low noise, high resistance to impact, high rotational accuracy, can be manufactured. Thus, an excellent apparatus which satisfies the demands of this industrial field can be provided at a low price.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A disk driving apparatus for driving a disk, the disk driving apparatus comprising:

a rotor adapted to rotate;

a hydrodynamic bearing mechanism for rotatably supporting the rotor;

a thrust bearing mechanism for axially supporting said rotor, the thrust bearing mechanism comprising a load support portion which comprises a rotation-side end surface and a fixation-side end surface, closely opposing each other, and a lubricating fluid;

a driving mechanism for driving and rotating said rotor;

means for generating an axial magnetic attraction force in order to press said rotation-side end surface and said fixation-side end surface of said thrust bearing mechanism toward each other;

means for limiting an amount of axial movement of the rotor in a direction of separation of said rotation-side end surface and said fixation-side end surface; and means for canceling variations in said axial magnetic attraction force through phase inversions of said variations so as to cancel vibrations of said rotor caused by said variations in said axial magnetic attraction force.

2. A disk driving apparatus according to claim 1, wherein said driving mechanism comprises a stator coil for generating a rotating magnetic field, a drive magnet magnetized at multiple poles, and a stator core which is positioned inside the drive magnet, said stator coil being wound around said stator core, and wherein axial relative positions of said drive magnet and said stator core are shifted from a neutral point of a magnetic attraction force so as to obtain a thrust bearing pressing force.

3. A disk driving apparatus according to claim 1, wherein said driving mechanism comprises a stator core, a stator coil wrapped around said stator core for generating a rotating magnetic field when said stator coil is powered, and a drive magnet magnetized at multiple poles, and wherein said rotor is formed with an opening end portion in substantially a cup shape, said drive magnet being firmly fixed to the opening end portion, and wherein said means for canceling comprises a ferromagnetic substance provided separately from said stator core and closely opposing said drive magnet.

4. A disk driving apparatus according to claim 1, wherein said driving mechanism comprises a stator coil for generating a rotating magnetic field, a hollow, cylindrical drive magnet magnetized at multiple poles, and a stator core which is positioned inside the drive magnet, said stator coil being wrapped around said stator core, axial relative positions of said drive magnet and said stator core being shifted from a neutral point of a magnetic attraction force, and said disk driving apparatus being provided with said drive magnet in an opening end portion of the rotor, and wherein said means for canceling comprises a ferromagnetic substance provided separately from said stator core and closely opposing said drive magnet.

5. A disk driving apparatus according to claim 4, wherein said ferromagnetic substance comprises means for producing a magnetic coupling between said drive magnet and said ferromagnetic substance, said magnetic coupling varying as said rotor rotates.

6. A disk driving apparatus according to claim 5, wherein said ferromagnetic substance has a rough surface.

7. A disk driving apparatus according to claim 5, wherein said ferromagnetic substance has an inclined surface.

8. A disk driving apparatus according to claim 5, wherein said ferromagnetic substance has a variable flatness.

9. A disk driving apparatus according to claim 5, wherein said ferromagnetic substance has a variable width.

10. A disk driving apparatus according to claim 5, wherein said ferromagnetic substance comprises a bent portion.

11. A disk driving apparatus according to claim 5, wherein said ferromagnetic substance is eccentric with respect to said rotor.

12. A disk driving apparatus according to claim 5, wherein said ferromagnetic substance is provided in divided portions.

13. A disk driving apparatus according to claim 5, wherein said ferromagnetic substance has gaps, so that only portions of said drive magnet face said ferromagnetic substance.

14. A disk driving apparatus according to claim 5, wherein said ferromagnetic substance has a plurality of notches formed therein.

15. A disk driving apparatus according to claim 1, further comprising a stationary member having a stationary member end surface, and wherein:

said rotor has a rotor end surface axially opposing said stationary member end surface; and said means for generating comprises:
   a thrust magnet provided on a first one of the stationary member end surface and said rotor end surface; and
   a ferromagnetic substance disposed on a second one of the stationary member end surface and the rotor end surface.

16. A disk driving apparatus according to claim 15, wherein said thrust magnet is magnetized to have a single pole with no rotational alteration of said single pole.

17. A disk driving apparatus according to claim 15, wherein said thrust magnet is magnetized to have multiple concentric poles.

18. A disk driving apparatus according to claim 1, wherein:

said rotor has a continuous end surface provided in a portion of said rotor to extend rotationally around an axis of rotation of said rotor; and said means for limiting comprises a locking member which is axially and closely placed on said continuous end surface.

19. A disk driving apparatus according to claim 18, further comprising a stationary mating member with respect to which said rotor rotates, and wherein said locking member is engaged with said continuous end surface, and said locking member is firmly fixed to said stationary mating member.

20. A disk driving apparatus according to claim 18, wherein said locking member comprises means for elastically and radially moving said locking member relative to the rotor so that said locking member is selectively engaged with or disengaged from said continuous end surface.

21. A disk driving apparatus according to claim 18, wherein said locking member comprises means for turning and moving said locking member relative to said rotor so that said locking member is selectively engaged with or disengaged from said continuous end surface.

22. A disk driving apparatus according to claim 1, wherein said means for limiting an amount of axial movement of the rotor comprises an end surface having a radius which varies in a direction of rotation of the rotor, and a locking member which is axially placed closely thereto.

23. A disk driving apparatus according to claim 22, wherein at least one of said end surface of said means for limiting and said locking member comprises a spiral approach portion.

24. A disk driving apparatus according to claim 1, wherein the driving mechanism comprises a stator and the means for limiting extends from the stator so as to closely oppose the rotor in an axial direction of the rotor.

25. A disk driving apparatus according to claim 1, further comprising an enclosure with a wall surface, wherein said wall surface of said enclosure is axially placed to oppose said rotor.

26. A disk driving apparatus according to claim 25, wherein said wall surface has a rotor abutment portion with means for adjusting an amount of movement of the rotor.

27. A disk driving apparatus according to claim 1, further comprising an enclosure for housing said disk, said rotor, said hydrodynamic bearing mechanism, said thrust bearing mechanism and said driving mechanism.

28. A disk driving apparatus according to claim 1, wherein said disk is a fixed disk, and wherein said rotor comprises means for fixing said disk to said rotor.

* * * * *